United States Patent
Bigolin

(10) Patent No.: US 7,322,644 B2
(45) Date of Patent: Jan. 29, 2008

(54) CUSHIONED SADDLE CONSTRUCTION FOR BICYCLES, MOTOR-CYCLES AND THE LIKE

(75) Inventor: Riccardo Bigolin, Rossano Veneto (IT)

(73) Assignee: Selle Italia S.R.L., Rossano Veneto, Vicenza (IT)

( * ) Notice: Subject to any disclaimer, the term of this patent is extended or adjusted under 35 U.S.C. 154(b) by 0 days.

(21) Appl. No.: 11/376,847

(22) Filed: Mar. 16, 2006

(65) Prior Publication Data

US 2006/0244290 A1 Nov. 2, 2006

(30) Foreign Application Priority Data

Apr. 27, 2005 (IT) .......................... MI2005A0759

(51) Int. Cl.
*B62J 1/00* (2006.01)

(52) U.S. Cl. ..................................... 297/201; 297/195.1

(58) Field of Classification Search ................ 297/201, 297/203, 209, 195.1
See application file for complete search history.

(56) References Cited

U.S. PATENT DOCUMENTS

| 2,288,163 | A | * | 6/1942 | Kalter ........................ 297/209 |
| 5,322,345 | A | * | 6/1994 | Desser et al. ............... 297/214 |
| 5,669,660 | A | * | 9/1997 | Matthies ................ 297/195.13 |
| 6,213,553 | B1 | * | 4/2001 | Fitz ............................ 297/314 |
| 6,595,586 | B2 | * | 7/2003 | Brightbill et al. ........... 297/312 |

* cited by examiner

*Primary Examiner*—Joe Edell
(74) *Attorney, Agent, or Firm*—Hedman & Costigan PC; James V. Costigan

(57) ABSTRACT

A cushioned saddle construction, for bicycles, motor-cycles or the like, comprises a saddle covering or body, associated with a framework, wherein the saddle covering or body and framework are coupled by a cushioning system, operated by a magnetic force generated by a plurality of permanent magnets.

3 Claims, 2 Drawing Sheets

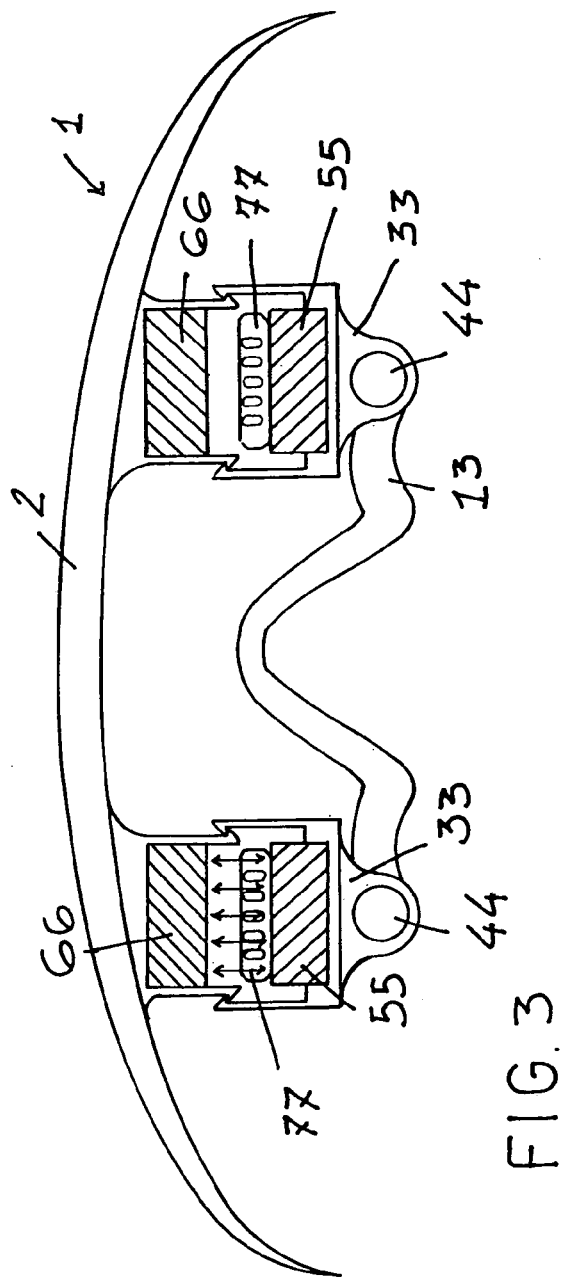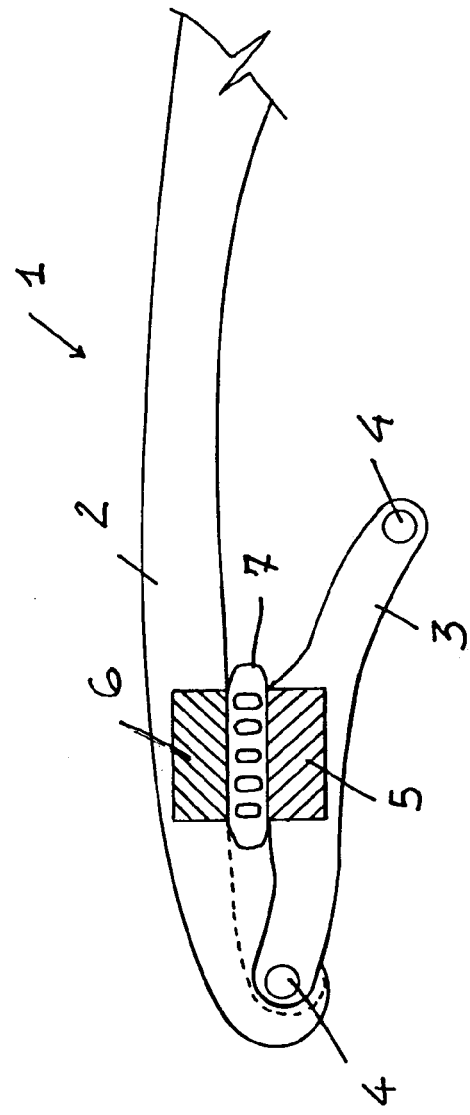

CUSHIONED SADDLE CONSTRUCTION FOR BICYCLES, MOTOR-CYCLES AND THE LIKE

BACKGROUND OF THE INVENTION

The present invention relates to a cushioned saddle construction, for bicycles, motor-cycles, or the like.

Cushioned bicycle and motor-cycle saddle, having an improved operation comfort, and including cushioning system comprising metal coil springs or resilient padding elements are already known.

SUMMARY OF THE INVENTION

The aim of the present invention is to provide a saddle construction including an improved cushioning system.

Within the scope of the above mentioned aim, a main object of the invention is to provide such a saddle construction including an adjustable cushioning system.

According to one aspect of the present invention, the above mentioned aim and object, as well as yet other objects, which will become more apparent hereinafter, are achieved by a cushioned saddle construction for bicycles, motor-cycles or the like, comprising a saddle covering or body associated with a framework, characterized in that said saddle body and framework are coupled by a cushioning system including magnetic means.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example, in the accompanying drawings, where:

FIG. 1 is a schematic side elevation view of the magnetic means of the saddle construction, applied at a front portion of said saddle construction;

FIG. 3 is a rear elevation view of the saddle construction magnetic means, applied at the rear of the saddle construction.

DESCRIPTION OF THE PREFERRED EMBODIMENT

Figure 4:
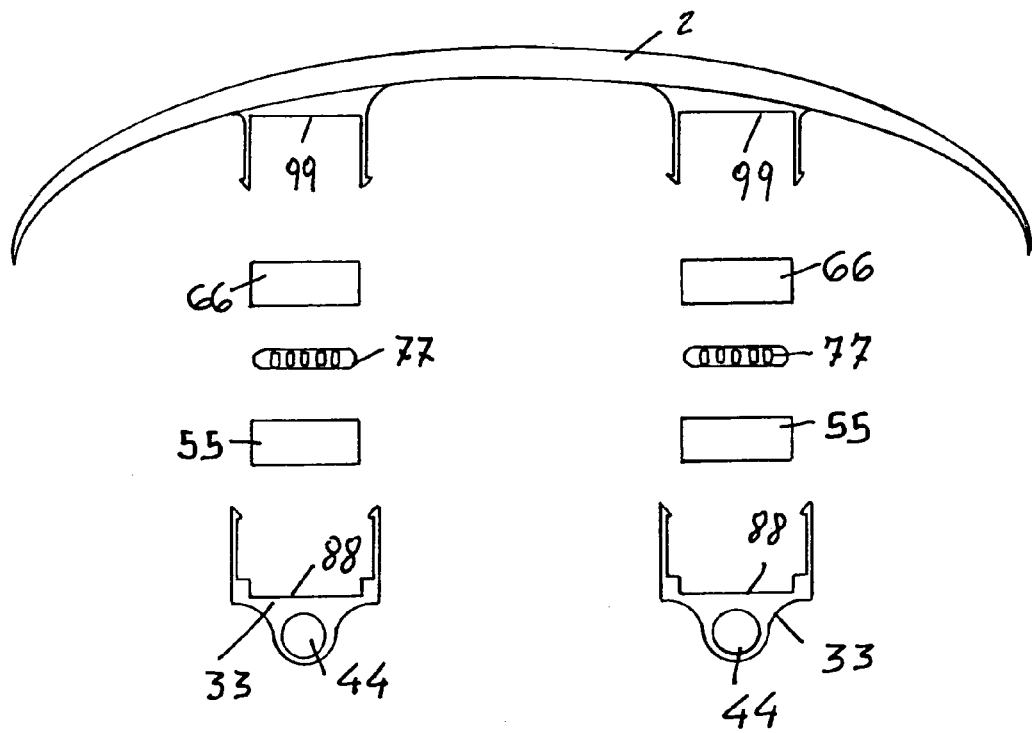
FIG. 4 is an exploded, rear elevation view, of the saddle construction magnetic means, applied to the rear of the saddle.

With reference to the number references of the above mentioned figures, the saddle construction according to the invention, which has been generally indicated by the reference number 1, comprises a framework 2 which is associated to a framework through an articulated support element 3.

The articulated support element 3, in particular, connects the framework of the saddle 1 to the saddle body 2, to allow the framework to freely rotate, while being pivoted at the tip of the saddle body.

As shown, on said articulated support 3 and saddle body 2 are respectively keyed a bottom magnet 5 and a top magnet 6, said bottom and top magnets 5, 6 providing a mutual repulsion magnetic force.

Said magnetic force contributes to properly supporting the saddle framework, while favoring the cushioning of the saddle on the front portion.

An adjusting system 7, arranged between said two magnets, allows the repulsion force to be properly adjusted.

Figure 2:
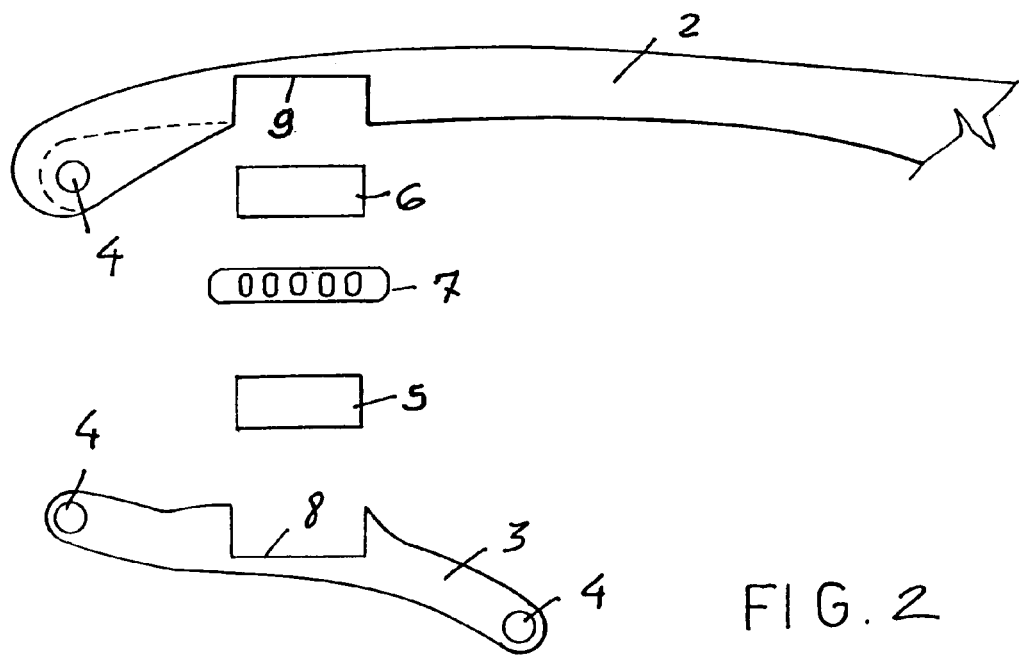
FIG. 2 is a further side elevation exploded view of the magnetic means of the subject saddle construction, applied to a front portion of the saddle construction.

The exploded view shown in FIG. 2, clearly illustrates the construction of the saddle front cushioning system, operating based on the magnetic repulsion force of the magnets 5 and 6 respectively keyed or engaged in housing recesses 8 and 9.

More specifically, the recess 8 is formed in the articulated support 3, whereas the recess 9 is formed in the saddle body 2.

The articulated support 3 and saddle body 2 are pivoted to and free to turn about the pivot pins 4.

FIGS. 3 and 4 show a rear cushioning system, applied to the saddle construction 1 according to the invention, comprising two bottom magnets 55 and two top magnets 66, engaged in respective engagement seats or recesses 88 and 89.

More specifically, the recesses 88 are formed in the bottom articulated support 33, and the engagement recesses 99 are formed in the saddle body 2.

The articulated support 33 is pivoted to the framework 13 through a pivot pin 44.

Also in this case, the magnets 55 and 66 generate a mutual repulsion magnetic force contributing to providing a proper supporting of the saddle body, thereby aiding the cushioning of the saddle on the rear part.

An adjusting system 77, arranged between the two magnets, allows to adjust the repulsion force.

It has been found that the invention fully achieves the intended aim and objects.

In fact, the invention provides a saddle construction for bicycles or motor-cycles, wherein the saddle covering, or body, and framework are coupled by a cushioning system, operating based on the magnetic force provided by a plurality of permanent magnets.

The operation principle is based on the mutual attraction and repulsion forces, generated by a plurality of permanent magnets, arranged with a given spacing from one another.

The saddle operating mechanism exploits the contribution of the balance of the magnetic attraction and/or repulsion forces, which uniquely characterizes the cushioning of the saddle covering on the saddle framework.

The cushioning mechanism of the saddle, based on the permanent magnets operation principle, can be applied only to the front portion of the saddle, or only to the rear portion thereof, or both on the front and rear portions.

The magnet housings and support elements, as well as the magnet housing and stem recess are mutually displaced as the weight of the user starts to be applied on the saddle body and the saddle framework (stem) is properly mounted on the bicycle saddle supporting sleeve assembly.

Said permanent magnets, as suitably designed, will provide a mutual repulsion magnetic force contributing to properly supporting the saddle body, while favoring, as stated, the cushioning of the saddle on the rear part.

In this connection it should be pointed out that the front cushioning system may have a lever arrangement of the first, second or third type.

Alternatively, said front cushioning system can comprise a linear guide, including a slide providing a mutual sliding between two bodies, with a force interposed therebetween.

Moreover, the saddle construction can also comprise a cushioning system, made by arranging magnetic means in operating mechanisms comprising kinematic elements, crank or lever elements and cam elements or the like.

In practicing the invention, the used materials, as well as the contingent size and shapes, can be any, depending on requirements and the status of the art.

The invention claimed is:

1. A cushioned saddle construction, for bicycles and motor-cycles, comprising a saddle body and a saddle framework, said saddle body having a tip portion and a rear portion, wherein said saddle body and saddle framework are coupled by an articulated support pivotably connecting said tip portion of said saddle body to said saddle framework, wherein said saddle construction further comprises at least a pair of opposite top and bottom magnets generating a repulsion force, to support and cushion said saddle body, and wherein an adjusting system is arranged between said top and bottom magnets for adjusting said repulsion force of said magnets.

2. A saddle construction, according to claim 1, wherein said at least a pair of magnets is arranged at said tip portion of said saddle body, said top magnet being engaged in a recess, formed in said saddle body, and said bottom magnet being engaged in a further recess formed in said articulated support.

3. A saddle construction, according to claim 1, wherein said saddle construction further comprises a further pair of opposite top and bottom rear magnets arranged at said rear portion of said saddle body, a repulsive force adjusting system being further arranged between said top and bottom rear magnets.

* * * * *